UNITED STATES PATENT OFFICE.

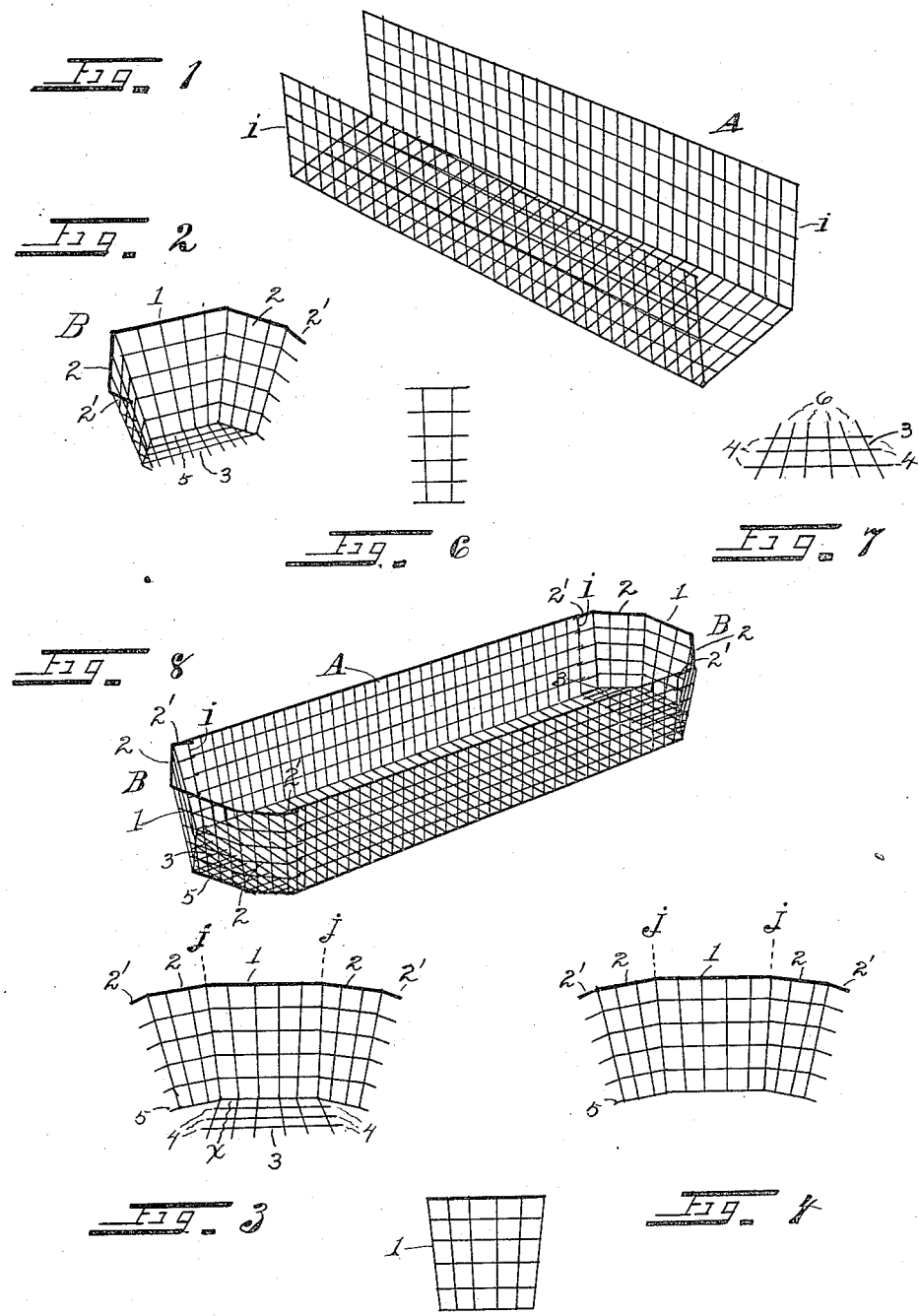

VICTOR E. RANDALL AND HOWARD E. RUSSELL, OF BATTLE CREEK, MICHIGAN.

REINFORCING STRUCTURE FOR BURIAL-CASES.

1,163,853.

Specification of Letters Patent. Patented Dec. 14, 1915.

Application filed August 24, 1914. Serial No. 858,312.

*To all whom it may concern:*

Be it known that we, VICTOR E. RANDALL and HOWARD E. RUSSELL, citizens of the United States, residing at Battle Creek, in the county of Calhoun and State of Michigan, have invented certain new and useful Improvements in Reinforcing Structures for Burial-Cases, set forth and described in the following specification.

The present invention relates to reinforcing structures for burial cases and more particularly refers to metallic reinforcing structures for burial cases in which cement or cement composition forms the body or superstructure therefor, although the same can be employed to advantage as a reinforcing structure for plastic formed bath tubs and other articles of a similar nature where the superstructure is of plastic composition.

Among reinforcing structures such as those made up from reticulated or expanded metal and wire screen of various types in general commercial use, a common method is to slit and cut away certain portions of the material, thence infold and wire the basket thus formed at some of its corners. Reinforcing structures made by the method named present certain objections, especially in caskets where thin walls are molded; for the reason that in uniting the contacting edges to form the ends the lapping by of material and wiring of the joints thus formed are more or less bulky and unstable.

The present invention has among other things to facilitate the formation of a reinforcing structure of the character that will be symmetrical, rigid and economical to build.

In the drawings forming a part of this specification: Figure 1— represents a formed up body of electrically welded rectangular mesh preparatory to fitting the ends thereto. Fig. 2— represents an electrically welded formed head. Fig. 3— is a plan of an end blank comprising integral angle end, side and bottom portions. Fig. 4— is a blank of a portion of an end, comprising an angle end and side portions. Fig. 5— is a blank of an end angle portion. Fig. 6— is a blank of an end side angle portion. Fig. 7— is a blank of an end bottom. Fig. 8— is a prospective view of a completed reinforcing structure.

Like marks of reference refer to corresponding parts throughout the different views.

In the formation of the main body portion A, a strip of electrically welded screen is cut to the desired length, which, if the superstructure has flaring or vertical sides with rectangular formed corners, it may be cut to a length intersecting said corners, but where the superstructure has its top opening longer than the bottom thereof, a preferred method is to form the screen of a length slightly shorter than the bottom length of the superstructure and have its end wires $i$, $i$, disposed parallel with respect to one another, and shape the side angles 2' of the heads B, to conform with the angular corners of the assembled structure as shown in Fig. 8.

In the formation of a tapering ended flaring topped head B as shown in Fig. 2, three principal modes of procedure may be employed, each and all of which, while entailing certain modifications in their make-up effect the same result when completed.

In Fig. 3 a blank is shown made up in such form that when properly infolded and welded forms a complete head as illustrated in Fig. 2. In forming up this blank, the angular sides 2, are disposed at angles from the end 1 in such manner that when inturned along the lines $j$, $j$, the flaring top edge will be on the same plane with the end 1, and by bending the bottom 3 along the line upward and welding the projecting wires 4 to the sides 2, along either bottom edge thereof, the bottom thus formed will be parallel with the plane of the top edge set forth.

A modified method of making a head consists in forming a blank as set forth in Fig. 4 in which the end 1 and angular sides 2, 2, are made integral, the blank being bent along the lines $j$, $j$, to form inturned sides, after which a pre-formed bottom 3, as shown in Fig. 7 is welded thereto. This bottom is connected by welding the extremities of the wires 6, along the narrow portion thereof to the bottom wire 5 intermediate of the sides 2, 2, and the extremities 4, to said wire along the bottom of said ends.

Another modification in forming a head as shown in Fig. 2, consists in forming the different angular surfaces independent of one another and then welding the several parts together. Figs. 5, 6 and 7 show an end, a side and a bottom respectively employed for the purpose.

The heads B, aforesaid, assembled in any of the modifications described or shown are made without waste of material from the fact that the material entering into their construction are cut into suitable lengths adequate to the purpose.

We are aware that electrically welded reinforcing structures having cut and inturned flaps wired together to form heads or ends have been employed for the purpose, but we are not aware of a reinforcing structure having especially formed heads electrically or otherwise welded to a structure has been employed for the purpose.

Having therefore set forth the object and advantages of our invention, what we claim as new and desire to secure by Letters Patent:—

1. In a reinforcing structure for burial cases, the combination with the channeled body portion having vertically disposed open ends and formed from a single rectangular metallic screen, of a flaring metallic screen end the cross wires of which are bent at the side edges of said end their ends terminating in alinement with the ends of the cross wires of the bottom thereof, the ends of the alined wires thus formed engaging a marginal wire of the end of said channeled body portion.

2. In a reinforcing structure for burial cases, the combination with the channeled open-ended body formed from a rectangular metallic screen having its ends in parallel vertical alinement, of rigid metallic screen heads formed from blanks, each blank of which comprises a bottom, an end formed as an extension of said bottom at a narrowed portion thereof and angular side portions having widened tops formed as extensions of said end, said angular side portions being bent toward one another on outwardly diverging lines intersecting said bottom with said end, said bottom being bent upwardly to meet the bottom edges of said angular side portions and welded thereto, the same forming a head with upwardly flaring sides and with a bottom disposed parallel with its top edge, the free ends of the cross-wires to the sides of a head being bent inwardly and disposed in alinement with the free ends of the cross-wires to said bottom, the free ends of the wires to the bottom and sides of a head being welded to a marginal wire at either end of said open-ended body, substantially as, and for the purpose set forth.

Signed at Battle Creek, Michigan, this 19th day of August, 1914.

VICTOR E. RANDALL.
HOWARD E. RUSSELL.

Witnesses:
R. G. LEITCH,
LEONA L. EINHARDT.

Copies of this patent may be obtained for five cents each, by addressing the "Commissioner of Patents, Washington, D. C."